(12) United States Patent
Lovelace et al.

(10) Patent No.: US 6,341,390 B1
(45) Date of Patent: Jan. 29, 2002

(54) PLUMBING TRAP SYSTEM

(76) Inventors: Eric James Lovelace, 116 Melrose Pkwy., East Patchogue, NY (US) 11772; Bonnie Suzanne Schnitta, 29 Gann Rd., East Hampton, NY (US) 11937

( * ) Notice: Subject to any disclaimer, the term of this patent is extended or adjusted under 35 U.S.C. 154(b) by 0 days.

(21) Appl. No.: 09/572,477

(22) Filed: May 17, 2000

(51) Int. Cl.[7] .............................. E03C 1/22; E03C 1/24; E03C 1/28
(52) U.S. Cl. ................................. 4/681; 4/679
(58) Field of Search ............................ 4/679–681, 640, 4/661; 137/247.41, 247.27; 138/145, 146, DIG. 3

(56) References Cited

U.S. PATENT DOCUMENTS

| | | |
|---|---|---|
| 311,086 A | 1/1885 | Putnam |
| 415,869 A * | 11/1889 | Kelly ..................... 137/247.27 |
| 1,268,379 A | 6/1918 | Murphy |
| 1,311,287 A | 7/1919 | Murphy |
| 1,698,667 A * | 1/1929 | Arnold ................... 137/247.27 |
| 2,089,231 A * | 8/1937 | Uline ..................... 137/247.27 |
| 2,644,543 A | 7/1953 | Russell |
| 4,938,241 A | 7/1990 | Teel |
| 5,381,834 A * | 1/1995 | King ..................... 138/DIG. 3 |
| 5,497,809 A * | 3/1996 | Wolf ..................... 138/DIG. 3 |
| 5,799,704 A * | 9/1998 | Andre ........................ 138/146 |
| 5,868,011 A | 2/1999 | Hawkins et al. |
| 5,975,846 A | 11/1999 | Wistinghausen |

* cited by examiner

Primary Examiner—Gregory L. Huson
Assistant Examiner—Tuan Nguyen
(74) Attorney, Agent, or Firm—Kenyon & Kenyon

(57) ABSTRACT

A plumbing trap system is provided with a pair of sanitary traps arranged in series between a first draining device and the waste line. The first draining device drains into the first, upstream sanitary trap and then into the second, downstream sanitary trap, and a second draining device drains into the second, downstream sanitary trap. Noise, which is caused by the draining of the second draining device and which emanates from the first draining device is thereby reduced.

20 Claims, 2 Drawing Sheets

PLUMBING TRAP SYSTEM

FIELD OF THE INVENTION

The present invention relates generally to a plumbing trap system.

BACKGROUND INFORMATION

In conventional systems, a single plumbing trap is located below an open drain and a drain, hose, pipe or the like from a machine (e.g., a dishwasher) that drains water or liquid. This configuration allows either the pressure change that results from fluid flow from the machine to have a direct force on the fluid in the single trap, or the fluid flow, to occur through the single trap.

The direct effect on the trap is a pressure differential, the resulting force from the pressure change on the fluid in the single trap system exceeding the pressure of the liquid in the single trap. This, in turn, allows the pressure change to be transmitted to the surface fluid on the open-air end of the trap. Due to the extreme and variable nature of the pressure change, a highly turbulent state of the liquid is created. This, in turn, allows the noise of the draining action to be audible in the open drain. In most cases, the noise level is almost that of a car passing.

Referring to FIG. 1, there is seen a schematic view of a conventional plumbing trap system 10, which includes a first draining device 14 and a second draining device 22. The first draining device 14 may be, for example, a sink, and the second draining device 22 may be, for example, a dishwasher. The sink 14 includes a drain 12, through which waste water flows into drain tube 16. The waste water flows from drain tube 16 through sanitary trap 18 to waste line 34 and then to the municipal sewer system, a septic tank or the like, not shown. A fitting 26 is provided in drain tube 16 and is adapted to receive a drain tube or hose 24 from the dishwasher 22. Waste water from the dishwasher 22 is conventionally pumped under pressure into the plumbing trap system 10 by a pump, not shown, and waste water from the dishwasher 22 drains through the plumbing trap system 10 in the same manner as waste water from drain 12. The draining action and pumping of the waste water from the dishwasher 22 causes noise to emanate from the drain 12, which is considered an "open-air" drain. The noise emanating from drain 12 has been measured empirically in one example to exceed 80 dB at its peak frequencies.

The literature is replete with descriptions of plumbing trap systems. For example, U.S. Pat. No. 311,086 to Putnam describes a water trap arrangement having a sanitary trap arranged in series with an inverted overflow. The sanitary trap and overflow are separated by a horizontal length of pipe.

U.S. Pat. No. 1,268,379 to Murphy describes a sanitary trap being provided with a pair of water seals arranged in series between a single draining device and the waste discharge. A vent is provided between the two water seals to discharge any gas, which is forced upstream under pressure, from emanating from the draining device. A plug is also provided between the water seals to allow access for clearing the trap should the trap become clogged.

U.S. Pat. No. 1,311,287 also to Murphy describes a similar sanitary trap having a pair of water seals arranged in series between a single draining device and the waste discharge.

U.S. Pat. No. 2,644,543 to Russell describes a waste fitting, which includes a pair of U-shaped traps arranged in parallel between a pair of sinks and the waste discharge pipe.

U.S. Pat. No. 4,938,241 to Teel describes a sanitary dumping bay and potable water system. The system includes a first drain for receiving waste material discharged from, for example, a recreational vehicle. The first drain feeds into a first trap. The system further includes a water supply for supplying potable water to the recreational vehicle, for supplying water to flush waste through the drain and for cleaning purposes. A backflow prevention device directs any water flowing back into the water supply into a drain, which includes a second trap. The two traps are arranged in parallel.

U.S. Pat. No. 5,868,011 to Hawkins et al. describes a water trap for a washing machine. The water trap is disposed between the drain of the tub of the washing machine and the pump, which pumps water from the drain. The water trap prevents noise caused by the pump from emanating from the drain.

Finally, U.S. Pat. No. 5,975,846 to Wistinghausen describes a pump for a household appliance, wherein a water trap is disposed between the drain of the appliance and the pump to limit noise emanating from the pump.

It is an object of the present invention to provide a plumbing trap system, which reduces the noise emanating from a first draining device caused by the draining of a second draining device.

SUMMARY

The above and other beneficial objects of the present invention are most effectively attained by providing a plumbing trap system as described and claimed herein. In one embodiment, the plumbing trap system includes two sanitary traps arranged in series. A first draining device drains into the first sanitary trap and then into the second sanitary trap, and a second draining device drains into the second sanitary trap. Noise caused by the draining of the second draining device and emanating from the first draining device is thereby decreased.

DETAILED DESCRIPTION

Figure 2:
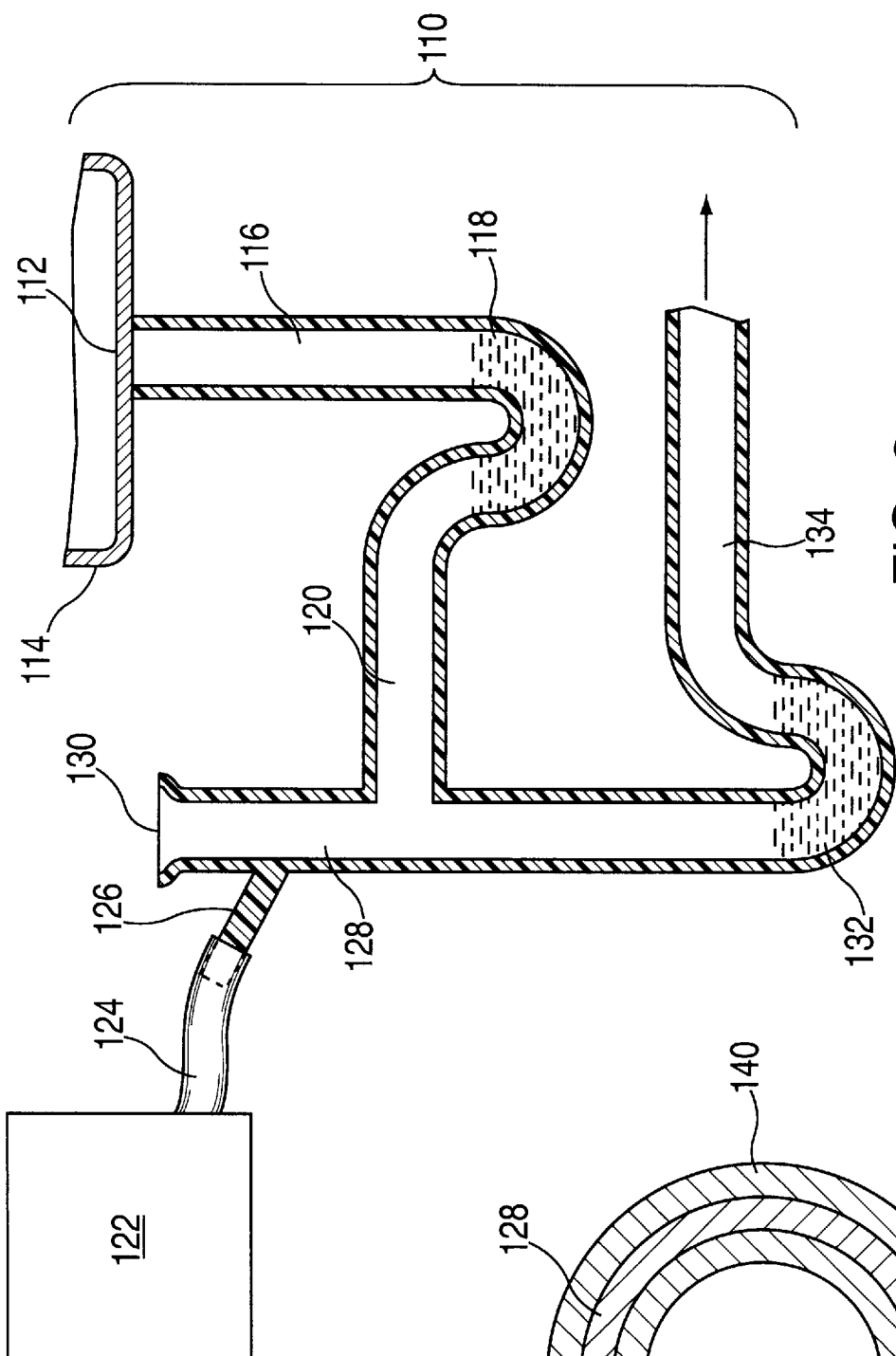
FIG. 2 is a schematic view of a plumbing trap system according to the present invention.

Referring to FIG. 2, there is seen a schematic view of an example embodiment of a plumping trap system according to the present invention. The example plumbing trap system 110 includes a first draining device 114, such as a sink. The first draining device 114 includes a drain 112, referred to hereinafter as first drain 112. The first drain 112 shown in FIG. 2 is a drain opening and is in fluid communication with a first drain pipe 116, which leads to a first sanitary trap 118. The first sanitary trap 118, in turn, leads to the discharge end 120 of the trap.

A second draining device 122 is schematically illustrated in FIG. 2 and may be, for example, a dishwasher. Second draining device 122 drains through a drain tube, hose or pipe 124 to an inlet 126, which, in turn, feeds into a second drain pipe 128. This connection is at a sufficient distance from discharge end 120 so as not to cause direct flow into discharge end 120, as well as to allow the fluid stream to become sufficiently developed. Second drain pipe 128 may include a cap 130 or may be vented through a vent stack in accordance with applicable housing codes. Discharge end 120 also feeds into second drain pipe 128. Second drain pipe 128 leads to a second sanitary trap 132, which, in turn, feeds into waste line 134. Waste line 134 feeds into, for example, the municipal sewer system, a septic tank or the like, not shown.

In operation, waste water and other waste material from first draining device 114 drains through first drain 112, then down first drain pipe 116, then through first sanitary trap 118, then through discharge end 120, then down second drain pipe 128, then through second sanitary trap 132, then through waste line 134 and finally to the municipal sewer system, septic tank or the like. The arrangement of the feed pipe 120 in relation to the inlet 126 prevents waste from the first draining device 114 from entering the second draining device 122. As illustrated in FIG. 2, the vertical position of the discharge end 120 relative to the inlet 126 prevents the flow of waste from first draining device 114 into second draining device 122.

Waste water and other waste material flowing from second draining device 122 flows through drain hose 124, then through inlet 126 and into second drain pipe 128. The waste then flows down second drain pipe 128, then through second sanitary trap 132, then into waste line 134. The waste then is fed into the downstream municipal sewer system, septic tank or the like, not shown. Again, the arrangement of inlet 126 and discharge end 120 prevents waste from flowing from second draining device 122 into first draining device 114. As illustrated in FIG. 2, the flow of the waste caused by gravity and by pumping minimizes the possibility of waste flowing upstream through the discharge end 120. The second draining device 122 drains into the second drain pipe 128 downstream of the first sanitary trap 118 to limit or reduce the noise caused by the draining of the second draining device 122 from emanating from the drain 112.

In the above described example embodiment, second draining device 122 is a dishwasher, although it should be understood and appreciated that second draining device 122 may be any type of draining device, including, but not limited to a dishwasher, washing machine or other household or commercial appliance. The second draining device 122 may include a pump 136, illustrated schematically in FIG. 2.

Figure 1:
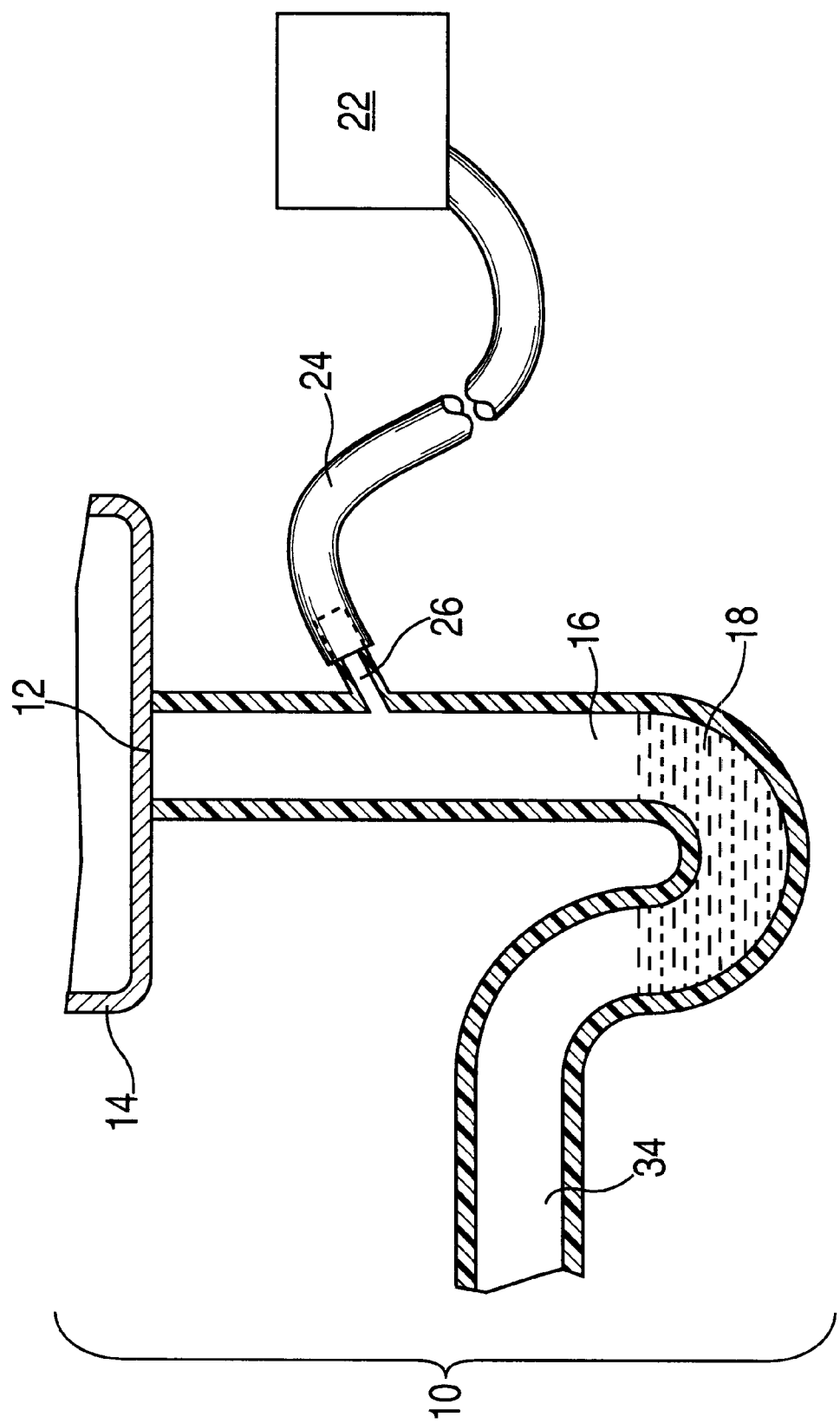
FIG. 1 is a schematic view of a conventional plumbing trap system.

The arrangement of a conventional plumbing trap system, such as that illustrated in FIG. 1, permits any pressure changes that result from the draining of the second draining device 22 to have a direct force on the fluid in the single sanitary trap 18. In addition, noise generated directly by the fluid flow can emanate from the drain 12. If the direct effect on the sanitary trap 18 is a pressure differential, whether from displaced air or liquid, the resultant force from the pressure change on the fluid in a single trap arrangement exceeds the pressure of the fluid in the single trap. As a result, the pressure change is transmitted to the surface fluid in the open-air end of the sanitary trap 18. Because of the extreme and variable nature of the pressure change, a highly turbulent state of the fluid in the trap is created, thereby causing the noise of the draining action to be audible at the open-air drain. In addition, the discrete change of direction of the fluid flow in the single trap arrangement creates a state of turbulence. This turbulent energy adds to the noise emanating from the open-air drain.

By inserting second sanitary trap 132 in series with first sanitary trap 118 so that the second draining device 122 drains into the plumbing trap system 110 therebetween, noise resulting from turbulence of the fluid draining from the second draining device 122 is substantially contained between the first sanitary trap 118 and the second sanitary trap 132. Thus, the noise level emanating from the first drain 112 is reduced.

In one example embodiment, the second sanitary trap 132 may be positioned approximately 3" below the height of the first trap 118 and approximately 12" below the height of discharge end 120. In this configuration, the noise emanating from the drain 112 may be approximately 50 dB at its peak frequencies. In the conventional arrangement, described above, the noise emanating is typically 80 dB at its peak frequencies. Accordingly, the present invention provides a significant reduction in noise.

To further attenuate the noise level emanating from drain 112, an interior coating or an exterior coating may be applied to one or more of the components of the plumbing trap system 110. The interior coating may be, for example, a friction-reducing or turbulence-reducing coating or a noise barrier. The exterior coating may be, for example, a noise barrier or other sound absorbing material. Alternatively or in addition to other noise-reduction measures, the geometry of the components of plumbing trap system 110 may be adapted to further attenuate the noise emanating from drain 12. It should be appreciated that any one or more of the components of the plumbing trap system 110 may be incorporated into the second draining device 122. Additional sanitary traps may be provided, if necessary.

Thus, the several aforementioned objects and advantages of the present invention are most effectively attained. Those skilled in the art will appreciate that many modifications of the preferred embodiment described hereinabove may be made without departing from the spirit and scope of the invention. Although a single preferred embodiment of the invention has been described and disclosed in detail herein, it should be understood that this invention is in no sense limited thereby and that its scope is to be determined by that of the appended claims.

Figure 3:
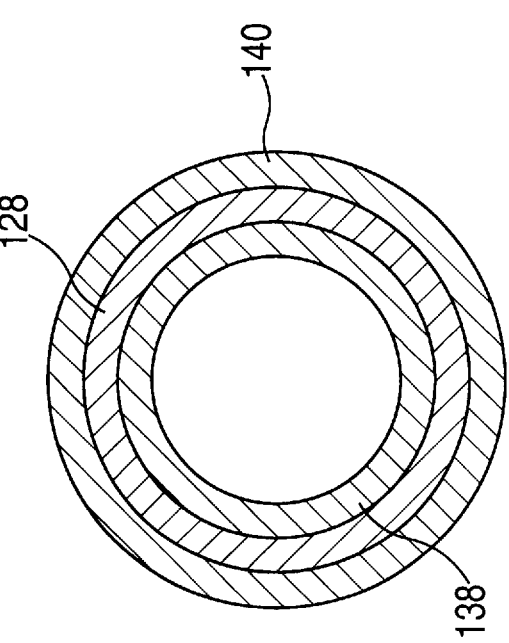
FIG. 3 is a cross-sectional view of a drain pipe of the plumbing trap system taken along the line 3—3 illustrated in FIG. 2.

Referring to FIG. 3, there is seen a cross-sectional view of the second drain pipe 128 taken along the line 3—3 illustrated in FIG. 2. As illustrated in FIG. 3, second drain pipe 128 may include an interior coating 138 and/or an exterior coating 140 as described hereinabove. It should be understood that such interior coating 138 and/or exterior coating 140 may be provided to any one or more of the components of the plumbing trap system 110 and that the interior coating 138 and exterior coating 140 are illustrated in FIG. 3 as being applied to second drain pipe 128 merely for illustrative purposes.

What is claimed is:

1. A plumbing system, comprising:
   a first sanitary trap in communication with open air;
   a second sanitary trap disposed downstream of the first sanitary trap;
   a first fluid conduit providing fluid communication between the first sanitary trap and the second sanitary trap;
   a waste line disposed downstream of the second sanitary trap;
   a second fluid conduit providing fluid communication between the second sanitary trap and the waste line;
   a first draining device draining waste material through the first sanitary trap, the waste material draining from the first sanitary trap through the first fluid conduit into the second sanitary trap and then from the second sanitary trap through the second fluid conduit into the waste line; and a second draining device draining waste material through the second sanitary trap, the waste material draining from the second sanitary trap through the second fluid conduit into the waste line.

2. The plumbing system according to claim 1, wherein the first draining device is an open-air draining device.

3. The plumbing system according to claim 1, wherein the second draining device includes a pump for pumping the waste material into the second sanitary trap.

4. The plumbing system according to claim 1, wherein the second draining device is one of a household appliance and a fluid-disposing machine.

5. The plumbing system according to claim 4, wherein the household appliance is one of a dishwasher and a washing machine.

6. The plumbing system according to claim 1, wherein a vent is provided between the first sanitary trap and the second sanitary trap.

7. The plumbing system according to claim 1, wherein an interior surface of at least one of the first fluid conduit, the second fluid conduit, the first sanitary trap and the second sanitary trap is provided with a noise barrier.

8. The plumbing system according to claim 1, wherein an interior surface of at least one of the first fluid conduit, the second fluid conduit, the first sanitary trap and the second sanitary trap is provided with a friction-reducing coating.

9. The plumbing system according to claim 1, wherein an exterior surface of at least one of the first fluid conduit, the second fluid conduit, the first sanitary trap and the second sanitary trap is provided with a noise barrier.

10. The plumbing system according to claim 9, wherein an exterior surface of at least one of the first fluid conduit, the second fluid conduit, the first sanitary trap and the second sanitary trap is further provided with a sound absorbing material.

11. The plumbing system according to claim 1, wherein the first sanitary trap is disposed at a height greater than a height of the second sanitary trap.

12. The plumbing system according to claim 11, wherein the height is adapted to create proper flow conditions.

13. A plumbing system for draining waste material from each of a first draining device and a second draining device into a waste line, the plumbing system comprising:

a first sanitary trap in communication with open air and adapted for receiving the waste material draining from the first draining device;

a second sanitary trap adapted for receiving the waste material draining from the second draining device; and a fluid conduit providing fluid communication between the first sanitary trap and the second sanitary trap;

wherein the waste material draining into the first sanitary trap drains from the first sanitary trap through the fluid conduit into the second sanitary trap;

and wherein the waste material draining into the second sanitary trap drains from the second sanitary trap into the waste line.

14. The plumbing system according to claim 13, wherein a vent is provided between the first sanitary trap and the second sanitary trap.

15. The plumbing system according to claim 13, wherein an interior surface of at least one of the fluid conduit, the first sanitary trap and the second sanitary trap is provided with a noise barrier.

16. The plumbing system according to claim 13, wherein an interior surface of at least one of the fluid conduit, the first sanitary trap and the second sanitary trap is provided with a friction-reducing coating.

17. The plumbing system according to claim 13, wherein an exterior surface of at least one of the fluid conduit, the first sanitary trap and the second sanitary trap is provided with a noise barrier.

18. The plumbing system according to claim 17, wherein the exterior surface of at least one of the fluid conduit, the first sanitary trap and the second sanitary trap is further provided with a sound absorbing material.

19. The plumbing system according to claim 13, where the first sanitary trap is disposed at a height greater than a height of the second sanitary trap.

20. The plumbing system according to claim 19, wherein the height is adapted to create proper flow conditions.

* * * * *